United States Patent

Deutscher et al.

[11] 3,876,286
[45] Apr. 8, 1975

[54] USE OF NEMATIC LIQUID CRYSTALLINE SUBSTANCES

[75] Inventors: Hans-Joachim Deutscher; Wolfgang Weissflog, both of Halle-Neustadt; Dietrich Demus; Gerhard Pelzl, both of Halle; Hermann Schubert, Nehlitz, all of Germany

[73] Assignee: VEB Werk fur Fernsehelektronik, Berlin-Oberschoneweide, Germany

[22] Filed: June 14, 1972

[21] Appl. No.: 262,809

[52] U.S. Cl....... 350/160 LC; 23/230 LC; 252/299; 252/408 LC
[51] Int. Cl. ............................................. G02f 1/28
[58] Field of Search ...... 252/408, 299; 350/160 LC; 23/230 LC

[56] References Cited
UNITED STATES PATENTS

| | | | |
|---|---|---|---|
| 3,597,044 | 8/1971 | Castellano | 350/160 LC |
| 3,625,591 | 12/1971 | Freiser | 350/160 LC |
| 3,689,525 | 9/1972 | Scheurle | 260/473 R |
| 3,690,745 | 9/1972 | Jones | 350/160 R |
| 3,772,209 | 11/1973 | Batesky | 23/230 LC |
| 3,772,210 | 11/1973 | Lodolini | 23/230 LC |
| 3,790,498 | 2/1974 | Katagiri et al. | 252/408 LC |
| 3,826,757 | 7/1974 | Wong | 252/408 |

FOREIGN PATENTS OR APPLICATIONS

| | | | |
|---|---|---|---|
| 1,148,724 | 4/1969 | United Kingdom | 252/408 LC |
| 1,170,486 | 11/1969 | United Kingdom | 252/408 |

OTHER PUBLICATIONS

Usol'Tseva et al., Chemical Characteristics, Structure and Properties of Liquid Crystal, Russian Chemical Reviews, Vol. 32, No. 9, pp. 495-507 (9/63).

*Primary Examiner*—William J. Van Balen
*Assistant Examiner*—William R. Dixon, Jr.
*Attorney, Agent, or Firm*—Nolte and Nolte

[57] ABSTRACT

In a system comprising means for generating an electric or magnetic field and a composition comprising a nematic liquid crystalline compound retained in the field, the improvement in which the nematic liquid crystalline compound is

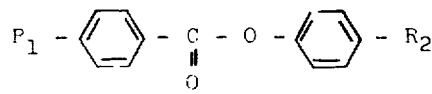

in which $R_1$ is $- OC_nH_{2n+1}$, $- C_nH_{2n+1}$, or

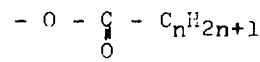

and $R_2$ is $- OC_nH_{2n+1}$ or $- C_nH_{2n+1}$ and each occurrence of $n$ is an individually selected integer of 1 to 12.

6 Claims, 3 Drawing Figures

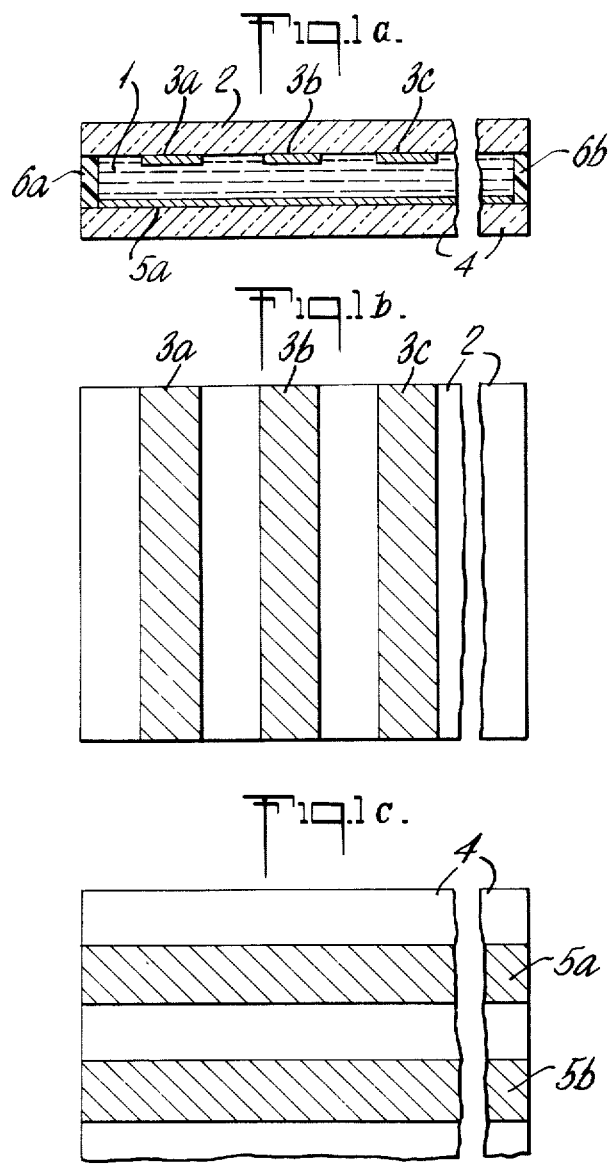

USE OF NEMATIC LIQUID CRYSTALLINE SUBSTANCES

This invention relates to the use of nematic liquid crystalline compounds in systems in which the orientation of the compound can be influenced by the effect of electric or magnetic fields. The invention relates especially to the use of these compounds in electro-optical systems for the projection of characters and images, particularly characters and images which are transient, changing or in motion.

Liquid crystalline compounds possess in a temperature interval between the melting point and a higher temperature, the clear point, a liquid crystalline nematic phase, which is also known as a phase characterized by the presence of nematic liquid crystals, or a mesomorphous phase or mesophase. Above the clear point the compounds are in an isotropic condition, below the melting point the compounds are in a crystalline solid condition.

It is known that nematic liquid crystals, due to their low viscosity, possess certain properties of liquids. On the other hand, these substances, due to the parallel arrangement of their molecules in the nematic state, are anisotropic in many of their properties such as dielectric constants, refractive index, diamagnetic magnetizability, electrical conductivity, and viscosity whereby in two directions perpendicular to each other constituting main axes these various properties have different values.

Normally the molecules of the nematic liquid crystals are only within relatively small zones, called domains, in which the molecules are oriented parallel to each other. The hereinabove referred to preferential direction caused by the parallel arrangement of the molecules differs from one domain to the next. However, by the effect of magnetic fields, the preferential directions of the various domains can be swung into a common direction, since the individual domains, due to the anisotropy of their diamagnetic magnetizability, tend to a minimum of potential energy with respect to magnetic fields. It is, furthermore, possible, by the introduction of temperature gradients, to produce currents in the nematic liquid, which cause an increase in orientation of the domains. Also, by causing the entire liquid to flow in a stream, a kind of orientation is attained. By introducing a nematic liquid between two lamella it is possible, depending on the pre-treatment of the lamella, to attain a preferential direction of the domains perpendicular to or parallel to the lamella. By prior careful purification of the lamella, a perpendicular orientation can be obtained, which in many cases by the addition of certain substances, such as t-aminocinnamic acid, can be further improved. If the lamella are, however, before the introduction of the nematic liquid, rubbed in a definite direction, the preferred direction of the domains is caused to be parallel to the direction of rubbing.

The orientation of a large number of nematic liquids in static and lower frequency electric fields is essentially complicated. In the application of fields above a certain pulsating field strength there forms in the nematic liquid domain boundaries, which are readily discernible under the microscope and which act as scattering centers for light impinging on or passing through the liquid. For this reason, by the application of electrical fields, the light permeability of a layer of this type of nematic liquid is decreased, the backscattering of impinging light conversely being increased. The formation of domains occurs quite rapidly and, likewise rapidly, the light permeability or light scattering changes.

If a nematic liquid crystalline substance is mixed with a non-liquid crystalline foreign substance, the molecules of the foreign substance assume the orientation of the liquid crystalline substance. With the assistance of this effect experiments with anisotropic properties in oriented molecules of non-liquid crystalline substances can be conducted or the properties of mixtures can be changed in numerous ways.

Nematic liquid crystals can be used in nuclear resonance spectroscopy, in spectroscopy in certain ultraviolet and infrared spectral fields, in electron spin resonance spectroscopy, and in the production of dichroitic layers, in which by one of the other aforementioned methods the liquid crystals are oriented. Especially by the influencing of nematic liquids in electric fields it is possible to construct and repeatedly use electro-optical cells for the projection of static or moving images and characters. For this purpose natural or polarized light can be used.

For the use of nematic liquid crystals it is necessary that the substance or the mixture be present in liquid crystalline nematic condition. A great proportion of the known substances used heretofore, however, possess a melting point which is far above room temperature. In the case of these substances, the cells in which the liquid crystals are used must be heated to the high temperatures, which is a disadvantage. Moreover, in many substances the temperature interval in which the nematic state lies is very small, which further complicates the use of the substance.

Some substances, the melting points of which are lower, have the disadvantage that they tend to decompose and for that reason are not suitable for the construction of long life liquid crystal cells.

A further disadvantage of many heretofore known nematic substances is that they absorb a certain spectrum of light and consequently are colored.

According to the present invention, it has been found that compounds of the general formula

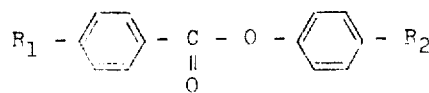

in which $R_1$ and $R_2$ are the organic groups listed in Table 1 hereinbelow, mixtures of these substances with one another and mixtures of these substances with other substances can be used in the liquid crystalline nematic state in electro-optical systems in which their orientation can be influenced.

Table 1

| $R_1$ (n = 1 to 12) | $R_2$ (n = 1 to 12) |
|---|---|
| 1. $-O\,C_nH_{2n+1}$ | $-O\,C_nH_{2n+1}$ |
| 2. $-O\,C_nH_{2n+1}$ | $-C_nH_{2n+1}$ |
| 3. $-C_nH_{2n+1}$ | $-O\,C_nH_{2n+1}$ |

4. $-C_nH_{2n+1}$    $-C_nH_{2n+1}$

5. $-O-\underset{O}{\underset{\|}{C}}-C_nH_{2n+1}$    $-O\ C_nH_{2n+1}$

6. $-O-\underset{O}{\underset{\|}{C}}-C_nH_{2n+1}$    $-C_nH_{2n+1}$

Many compounds of this class of compounds possess relatively low melting points and, on the other hand, a sufficiently large temperature interval in which the nematic state is present (see Table 2 hereinbelow).

TABLE 2

Examples of Compounds of the Class

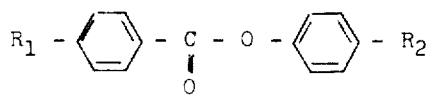

| No. | $R_1$ | $R_2$ | Melting point | Clear point |
|---|---|---|---|---|
| 1 | $CH_3O-$ | $C_6H_{13}O-$ | 55 | 77 |
| 2 | $C_5H_{11}O-$ | $C_8H_{17}O-$ | 48 | 82 |
| 3 | $C_6H_{13}O-$ | $C_7H_{15}O-$ | 54 | 87 |
| 4 | $C_6H_{13}O-$ | $C_8H_{17}O-$ | 51 | 89 |
| 5 | $C_8H_{17}O-$ | $C_6H_{13}O-$ | 55 | 90 |
| 6 | $C_6H_{13}O-$ | $C_9H_{19}-$ | 39 | 66 |
| 7 | $C_7H_{15}O-$ | $C_5H_{11}-$ | 42 | 61 |
| 8 | $C_5H_{11}O-$ | $C_5H_{11}-$ | 39 | 54 |
| 9 | $C_6H_{13}O-$ | $C_5H_{11}-$ | 44 | 70 |
| 10 | $C_6H_{13}O-$ | $C_7H_{15}-$ | 41 | 68 |
| 11 | $C_6H_{13}-$ | $C_8H_{17}O-$ | 44 | 56 |
| 12 | $C_6H_{13}-$ | $C_{10}H_{21}O-$ | 44 | 58 |
| 13 | $C_6H_{13}-$ | $C_4H_9O-$ | 39 | 49 |
| 14 | $C_7H_{15}-$ | $C_4H_9O-$ | 46 | 56 |
| 15 | $C_9H_{19}-$ | $C_4H_9O-$ | 44 | 58 |
| 16 | $C_6H_{13}-$ | $C_3H_7-$ | 22 | 11 |
| 17 | $C_6H_{13}-$ | $C_4H_9-$ | 13 | 1 |
| 18 | $C_6H_{13}-$ | $C_5H_{11}-$ | 27 | 18 |
| 19 | $C_6H_{13}-$ | $C_7H_{15}-$ | 31 | 24 |
| 20 | $C_6H_{13}-$ | $C_9H_{19}-$ | 32 | 28 |
| 21 | $C_6H_{13}COO-$ | $C_4H_9O-$ | 54 | 85 |
| 22 | $C_7H_{15}COO-$ | $C_4H_9O-$ | 59 | 90 |
| 23 | $C_6H_{13}COO-$ | $C_6H_{13}O-$ | 54 | 84 |
| 24 | $C_5H_{11}COO-$ | $C_2H_5O-$ | 63 | 104 |
| 25 | $C_5H_{11}COO-$ | $C_6H_{13}O-$ | 55 | 88 |
| 26 | $C_5H_{11}COO-$ | $C_6H_{13}-$ | 38 | 54 |
| 27 | $C_5H_{11}COO-$ | $C_7H_{15}-$ | 42 | 62 |
| 28 | $C_5H_{11}COO-$ | $C_2H_5-$ | 35 | 48 |
| 29 | $C_5H_{11}COO-$ | $C_5H_{11}-$ | 39 | 61 |
| 30 | $C_5H_{11}COO-$ | $C_6H_{13}-$ | 37 | 54 |

As examples of heretofore known nematic liquids there may be mentioned: 4,4'-azoxyanisole (melting point 117°C. clear point 136°C), 4-butyloxybenzoic acid (melting point 147°C, clear point 161°C); anisylidene-p-aminophenyl acetate (melting point 83°C, clear point 108°C).

4,4'-azoxyanisole (as in the case of all other azoxy compounds) absorbs light in certain spectral ranges and for that reason is colored yellow, while the compounds according to the invention are completely colorless.

There is a known class of compounds of the type

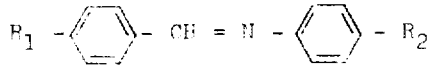

(azomethine compounds) in which $R_1$ and $R_2$ are organic residues such as

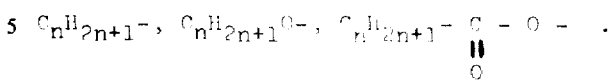

These compounds are much less stable thermally, chemically and relative to prolonged exposure to electric fields than the compounds of the present invention.

By mixing two or more substances of the present invention a melting point depression occurs. While the the melting point of the mixture is markedly depressed the clear point is not significantly lowered. In this way, the range of the nematic state is considerably increased. By mixing a plurality of the substances, a mixture can be produced the melting point of which is below room temperature.

The substances of the invention are relatively easily produced and for that reason are relatively inexpensive.

The substances of the invention in which $R_1$ is $C_nH_{2n+1}O-$ and $R_2$ is $C_nH_{2n+1}O-$, as well as their mixtures with one another and with other substances are well suited for electro-optical systems based on scattering effects in which by the application of an electrical field the light permeability or light scattering is changed.

The value of an electro-optical system depends essentially on the contrast ratio. The contrast ratio of transmitted light is defined as the ratio of the light intensities with and without an electrical field and reaches a satisfactory value at high field strengths. The contrast ratio depends, all other things being equal, strongly upon the measuring apparatus. A microscope on the objective of which is placed an electro-optical cell may serve as the measuring apparatus, for example. Natural light passes through the cell and the light passes through the objective onto a photo element, the photoelectric voltage of which is measured by a galvanometer.

In order to compare the contrast ratios of various substances, it is necessary to measure them under the same conditions and, above all, with the same apparatus. In certain systems other than microscopic measuring apparatuses higher contrast ratio values can be obtained for the same substances without the electro-optical properties of the substances actually being improved. In the present specification, all of the contrast ratios are determined by the use of a microscopic measuring apparatus.

In order to improve the contrast ratios of mixtures for use in systems utilizing the scattering effect, additions of special compounds may be made. It has been found that, according to the invention, cyclohexanone derivatives of the type.

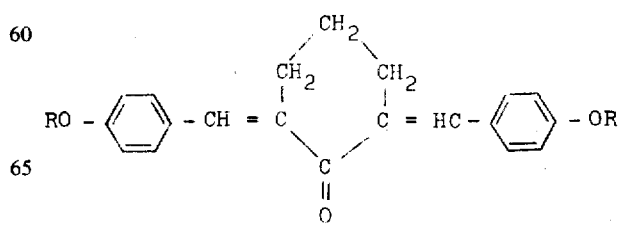

in which R is $C_nH_{2n+1}-$ ($n$ is 1–8) have especially high contrast ratios. By the addition of these cyclohexanone derivatives to compounds or mixtures of the class p-substituted phenyl-p'-substituted benzoic acid esters, the contrast ratios can be significantly improved.

Compounds according to the invention which become oriented in electric fields in electro-optical systems homogeneously, with no additional scattering centers or domains being created by the application of the electric field are those having the following substituents:

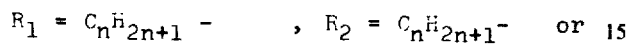

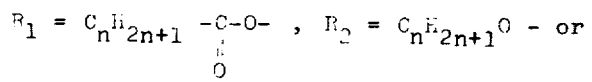

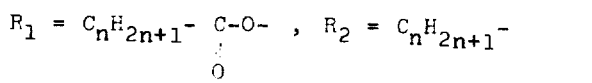

In like manner behave mixtures of these compounds with one another as well as mixtures of these compounds with non-liquid crystal substances.

The molecules of the non-liquid crystal substance assume the orientation of the nematic liquid. By the use of this type of nematic mixture it is possible to investigate at room temperature anisotropic properties of the non-liquid crystal substance, which is advantageous in various types of spectroscopy, such as NMR-spectroscopy, IR-spectroscopy and UV-visible spectroscopy. Furthermore, it is possible, with the aid of this type of mixture in which the non-liquid crystal substance is a dichroitic substance, such as methyl red (color Index No. 13020), Biebrich Scarlet BPC (Color Index No. 25105), Indophenol Blue (Color Index No. 49700), N,N'-dimethylindigo and the like to construct electro-optical systems for the reproduction of colored drawings, characters and pictures.

In the drawings:

FIG. 1a is a schematic cross-sectional view of an electro-optical cell utilizing liquid crystal compounds of the invention;

FIG. 1b is a schematic plan view of the front plate of the cell of FIG. 1a, showing the inside face; and FIG. 1c is a schematic plan view of the back plate of the cell of FIG. 1a, showing the inside face.

The invention will now be further described by reference to the following examples.

EXAMPLE 1

(Production of the Compounds of the Invention)

One-thirtieth mole of p-substituted phenol is dissolved in 50 ml of pyridine. To this solution over a period of 15 minutes one-thirtieth mole of p-substituted benzoyl chloride is added, with stirring, dropwise. Pyridinium chloride precipitates out. The reaction proceeds according to the following equation:

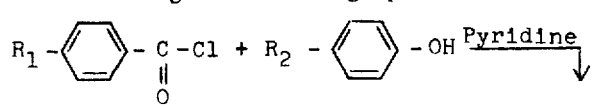

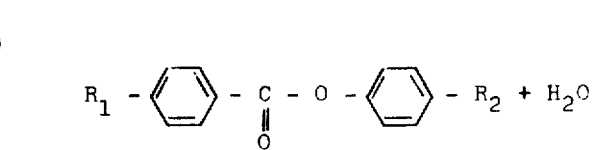

The reaction mixture is kept overnight in a refrigerator. Then, to the reaction flask is added 200 g. of ice and 20 ml. of concentrated sulfuric acid and the reaction mixture is stirred for an hour. The reaction mixture is filtered and the residue, which is the desired reaction product, is washed with 5% hydrochloric acid and much water. The yield is 90–95% of theoretical.

While azomethine compounds are unstable in contact with weak acids or as absorbed on aluminum oxide, and decompose, the substances according to the invention under these conditions are stable for a long time and can, for example, be chromatographically purified in columns containing aluminum oxide.

EXAMPLE 2

The increased thermal stability of compounds of the invention is demonstrated in the following example:

Samples of the substance

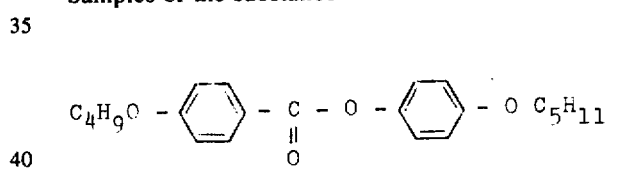

and of anisylidene p-aminophenylacetate

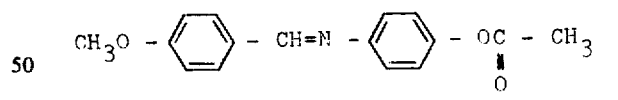

are heated under equal conditions at 150°C in a micro heater for 3 hours. The conversion temperatures are changed as a result of the heating as follows:

| Substance | Before heating | | After heating | |
|---|---|---|---|---|
| | Melting point | Clear point | Melting point | Clear point |
| $C_4H_9O$ —⟨⟩— C-O— ⟨⟩— O $C_5H_{11}$ (‖ O) | 49.8 | 84.3 | 49.5 | 84.0 |
| anisylidene p-aminophenylacetate | 83 | 108 | 70 | 75 |

The other compounds within the scope of the invention are similarly thermally stable.

EXAMPLE 3

The azomethine compound

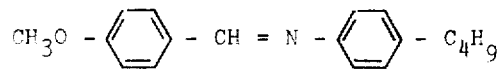

(anisylidene p-aminobutylaniline) is exposed for 24 hours at 25°C to a static electric field having a field strength of 2 · 10⁴ volt/cm. The compound decomposes very markedly, turning brown in color and throughout having gas bubbles formed therein, rendering the compound entirely useless for electro-optical purposes. Compounds of the invention demonstrate in a corresponding exposure to an electric field no signs whatever of decomposition, which is demonstrated for example by the conversion temperatures remaining the same; also, the electro-optical properties remain unchanged.

EXAMPLE 4

The lowering of the melting temperature and the broadening of the nematic state in mixtures according to the invention is demonstrated by the examples tabulated in Table 3.

TABLE 3

Conversion temperatures of mixtures of Compounds

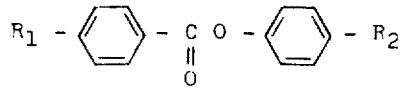

| Wt. % | $R_1$ | $R_2$ | Melting pt. °C | Clear pt. °C |
|---|---|---|---|---|
| 42 | $CH_3O-$ | $C_4H_9-$ | 46 | 85 |
| 58 | $C_4H_9O-$ | $C_5H_{11}O-$ | | |
| 50 | $C_5H_{11}O-$ | $C_6H_{17}O-$ | 17 | 67 |
| 50 | $C_6H_{13}-$ | $C_4H_9O-$ | | |
| 58 | $C_6H_{13}-$ | $C_4H_9O-$ | 19.5 | 50.0 |
| 42 | $C_6H_{13}-$ | $C_nH_{17}-$ | | |
| 33 | $C_6H_{13}-$ | $C_nH_{17}-$ | 7.5 | 65 |
| 33 | $C_6H_{13}-$ | $C_4H_9O-$ | | |
| 34 | $CH_3O-$ | $C_4H_9O-$ | | |
| 33 | $C_6H_{13}-$ | $C_nH_{17}O$ | 13 | 70 |
| 34 | $C_6H_{13}-$ | $C_4H_9O-$ | | |
| 33 | $C_4H_9O-$ | $C_8H_{11}O-$ | | |

EXAMPLE 5

An electro-optical cell for the use of the substances according to the invention may be constructed as illustrated in FIGS. 1a to 1c. Specifically, a glass plate 2 is provided with band-shaped electrically conductive electrodes 3a, 3b, 3c, constituted of zinc oxide and serves as the front electrode of the electro-optical apparatus. A glass plate 4 facing the glass plate 2 is provided with band-shaped electrically conductive electrodes 5a, 5b constituted of zinc oxide and serves as the back electrode. Between the plates 2 and 4 a liquid crystal layer 1 is located, the thickness of which is set at a value between 10 and 100 microns by Teflon spacers 6a and 6b.

By applying a voltage across each of the band-shaped electrodes of the front and back plates an electric field is formed at the intersections of the electrodes which changes the light permeability of the nematic layer. In this connection, it will be appreciated from the drawings that the front and back sets of electrodes extend transversely, and preferably perpendicularly, of one another. By reversing the voltages on the other electrodes each point in the cell can be individually controlled. The number of electrodes can, to that end, be greatly increased; the width of the electrodes can be as small as about 0.03 mm. and their distance from one another can be about 0.15 mm.

If the electrode 4 is made of a light conducting material, the intensity of light reflected back by the electrodes from light beamed onto the cell can be varied by application of a varying voltage across the electrodes.

EXAMPLE 6

The quality of an electro-optical apparatus provided with a nematic substance is determined essentially by the contrast ratio. The contrast ratio of known nematic substances, such as anisylidene p-aminophenylacetate, azoxyanisole and anisylidene p-butylaminoaniline is about 1:3 to about 1:6. Compounds of the invention in which $R_1$ is $C_nH_{2n+1}O-$ and $R_2$ is $C_nH_{2n+1}O-$ and mixtures thereof with one another have contrast ratios of 1:4 to 1:7. If these compounds are mixed with other compounds in which $R_1$ and/or $R_2$ are groups selected from Table 1 other than those aforementioned, the contrast ratios of the mixtures are lower and decrease as the proportion of such other compounds is increased.

EXAMPLE 7

To improve the contrast ratios of mixtures of compounds according to the invention, cyclohexanone derivatives of the type

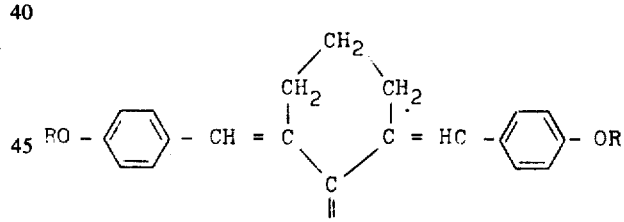

in which R is $C_nH_{2n+1}$ in which n is 1 to 8, can be added. The mixture of, by weight, 17.8% $CH_3O-$⟨⟩$-COO-$⟨⟩$-O\ C_6H_{13}$ 31.5% $C_5H_{11}O-$⟨⟩$-COO-$⟨⟩$-O\ C_8H_{17}$ 21.9% $C_6H_{13}O-$⟨⟩$-COO-$⟨⟩$-O\ C_7H_{15}$ 28.8% $C_6H_{13}O-$⟨⟩$-COO-$⟨⟩$-O\ C_4H_9$ is nematic at room temperature and exhibits a contrast ratio of 1:4. By the addition of 2% by weight of 1,4-di-(N-propyloxybenzylidene-cyclohexanone the contrast ratio is increased to 1:6, and by 6% by weight, addition, to 1:7.

EXAMPLE 8

In a magnetic field having a field strength of over 2000 oersted nematic liquids constituted of compounds of the invention and mixtures thereof are fully oriented so that the lengthwise molecular axes are parallel to the magnetic field. If to the nematic liquids of the invention are added pure non-crystalline liquids such as azobenzene, quinoxaline, azoxybenzene, benzylideneaniline, 3,3,3-trichloropropylene oxide, bicyclobutane, diphenyl, n-butylbenzene and the like, the nematic state is maintained and the added substance assumes the orientation of the nematic liquid. By the use of such nematic mixtures, it is possible to experiment at room temperature with anisotropic properties of the added substances, which is advantageous in various types of spectroscopy, such as NMR-spectroscopy, IR-spectroscopy and UV-spectroscopy.

EXAMPLE 9

1% by weight of methyl red is dissolved in

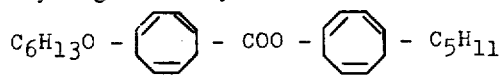

and is placed between two glass plates at 55°C which plates are provided with a transparent electrically conductive coating. The thickness of the layer of the mixture of compounds is 15 microns. The specimen exhibits a red color when light is transmitted therethrough. By the application of a static electric field having a field strength of $3 \cdot 10^3$ V/cm. the color is changed to yellow.

What is claimed is:

1. In a system comprising means for generating an electric or magnetic field and a composition comprising a nematic liquid crystalline compound retained in the field the improvement in which the nematic liquid crystalline compound is

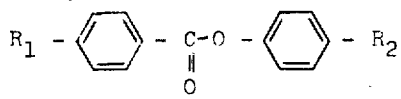

in which $R_1$ is $-OC_nH_{2n+1}$ or $-C_nH_{2n+1}$ and $R_2$ is $-OC_nH_{2n+1}$ or $-C_nH_{2n+1}$ and each occurrence of $n$ is an individually selected integer of 1 to 12.

2. In a system according to claim 1, in which the composition comprises a mixture of at least two of said nematic liquid crystalline compounds, the mixture having a lower melting point than the individual compounds and, hence, a broader temperature range in which the nematic liquid crystalline state exists, said melting point being no higher than about room temperature.

3. In a system according to claim 1, in which the system further comprises a non-liquid crystal substance, said substance being oriented with the nematic liquid crystalline compound when the electric or magnetic field is generated.

4. In a system according to claim 1, in which the system is electro-optical and includes means for varying at least portions of the field thereby to vary the light permeability or light scattering of the nematic liquid crystal compound and in the compound $R_1$ and $R_2$ are each $-OC_nH_{2n+1}$.

5. In a system according to claim 4, in which the composition further comprises a compound of the formula

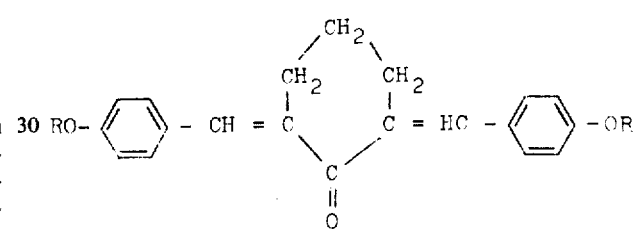

in which R is $-C_nH_{2n+1}$, in which in each R $n$ is an individually selected integer of from 1 to 8.

6. In a system according to claim 1, in which $R_1$ is $C_nH_{2n+1} - O-$ or $C_nH_{2n+1}$ and $R_2$ is $-C_nH_{2n+1}$, and the composition further comprises a dichroitic compound selected from the group consisting of methyl red (Color Index No. 13020), Biebric Scarlet BPC (Color Index No. 25105), Indophenol Blue (Color Index No. 49700) and N,N'-dimethylindigo.

* * * * *